United States Patent [19]

Park

[11] Patent Number: 5,725,449

[45] Date of Patent: Mar. 10, 1998

[54] IMPACT PULLEY

[75] Inventor: Daniel Clark Park, West Linn, Oreg.

[73] Assignee: Bell & Howell Mail Processing Systems, Durham, N.C.

[21] Appl. No.: 731,876

[22] Filed: Oct. 18, 1996

[51] Int. Cl.$^6$ .................................................. F16H 55/14
[52] U.S. Cl. ...................................... 474/94; 74/83
[58] Field of Search ........................ 474/47, 50, 94, 474/152, 153, 165, 166; 74/82, 83, 411

[56] References Cited

U.S. PATENT DOCUMENTS

| | | | |
|---|---|---|---|
| 2,879,873 | 3/1959 | Spase | 474/94 X |
| 3,127,203 | 3/1964 | Poundstone | 474/94 X |
| 3,380,314 | 4/1968 | Halsted | 474/94 |
| 3,610,063 | 10/1971 | Hart | 474/94 |
| 3,828,621 | 8/1974 | Uchino | 474/94 X |
| 5,035,678 | 7/1991 | Hageman | 474/50 |
| 5,073,148 | 12/1991 | Dec | 474/94 |
| 5,324,237 | 6/1994 | Bilsing et al. | 474/94 |
| 5,520,583 | 5/1996 | Balingit et al. | 474/50 |
| 5,607,023 | 3/1997 | Palm | 74/411 X |

*Primary Examiner*—Roger J. Schoeppel
*Attorney, Agent, or Firm*—Richard E. Jenkins, P.A.

[57] ABSTRACT

An impact pulley apparatus and method are provided for use with a high-speed media processing apparatus by driven attachment to the rotatable shaft of a motor associated therewith to absorb impact energy caused by the high-speed media processing apparatus encountering media to be conveyed. The impact pulley apparatus includes a base plate for mounting on the rotatable shaft such that rotation of the shaft causes identical and simultaneous rotation of the base plate. A pulley member is operatively connected to the base plate by biasing members which are springs in the preferred embodiment such that the pulley member is substantially identically rotatable with rotation of the base plate in one direction in a non-actuated position until an amount of impact energy is encountered by the pulley member sufficient for the pulley member to biasedly rotate in the same direction less than the base plate in an actuated position of the impact pulley apparatus in order to absorb the impact energy.

19 Claims, 5 Drawing Sheets

IMPACT PULLEY

TECHNICAL FIELD

The present invention relates generally to an apparatus and method for absorbing impact energy in high-speed media processing. More particularly, the present invention relates to an impact pulley apparatus and method of using the same for attachment to a rotatable shaft of a motor of a high-speed media processing apparatus to absorb impact energy caused by the high-speed media processing apparatus encountering media to be conveyed.

RELATED ART

High-speed media processing apparatuses and methods are well known for transporting or conveying a variety of media such as, for example, envelopes and envelope inserts often comprising folded sheets of paper. At least one belt is typically utilized in such high-speed media processing and frequently includes one or more push members, which can be referred to as "push pins" or "push lugs", attached thereto for engaging and forcibly conveying media by rotation of the belt in a predetermined direction. The belt is commonly in operative contact with a gear or pulley which is connected to a rotatable shaft of a motor for rotatably driving the belt. It can therefore be readily understood that operation of the motor to rotate the rotatable shaft and gear attached thereto in turn causes rotation of the belt and the one or more push members mounted thereon in order for the push members to engage and forcibly convey media encountered by the push members.

It is common for the media to be conveyed to be stationary when the push members encounter the media, although the media can be moving as well. When the push members encounter media to be conveyed, the push members can also encounter instantaneous impact energy from the media. This impact energy is commonly referred to as an "impact load" and can occur in the form of rotational resistance. If a push member is at full speed when it first encounters stationary media to be conveyed, the media must immediately accelerate to the speed of the push member unless there is some mechanism for compensation or compliance. This instantaneous acceleration imparts large forces on both the media and the high-speed media processing apparatus, particularly the motor used to rotatably drive the belt. The instantaneous impact load can cause damage to the encountered media as well as to the motor through the shaft by exceeding the rated torque of the motor. High-speed media processing apparatuses encountering impact loads have in the past been traditionally controlled with a closed-loop system. Such a closed-loop control system requires an encoder and a sophisticated control algorithm, thereby increasing the cost of the high-speed media processing apparatus.

As will be apparent to those of skill in the art of high-speed media processing, the use of a step motor to rotatably drive the belt is advantageous and desirable because of the precise control afforded by the step motor and therefore the belt driven thereby. When a high-speed media processing apparatus utilizing a step motor encounters an impact load, the impact load can cause the step motor to lose steps and thereby change its rotary position. If the step motor is controlled open-loop, this change cannot be detected, and the function of a mechanism driven by the step motor will likely be compromised. In order to compensate for an impact load resulting from one or more of the push members of a high-speed media processing apparatus encountering media to be conveyed, it is possible for an oversized step motor to be utilized in an effort to handle the impact load. Unfortunately, this approach to compensating for the impact load increases the cost, power consumption and size of the high-speed media processing apparatus.

In light of the reasons discussed hereinabove, there exists much room for improvement in the art of high-speed media processing for an impact pulley apparatus and method for absorbing an impact load resulting from a high-speed media processing apparatus encountering media to be conveyed, particularly where the high-speed media processing apparatus utilizes a step motor.

DISCLOSURE OF THE INVENTION

The present invention provides an impact pulley apparatus and method for use with a high-speed media processing apparatus by driven attachment to a rotatable shaft of a motor associated therewith to absorb the impact load (impact energy) resulting from the high-speed media processing apparatus encountering media to be conveyed. The impact pulley apparatus comprises a base plate for mounting on the rotatable shaft such that rotation of the shaft causes identical and simultaneous rotation of the base plate. A pulley member is operatively associated with the base plate and adapted for engaging the belt of the high-speed media processing apparatus to apply rotational force thereto.

The impact pulley apparatus further comprises biasing means operatively connecting the base plate and the pulley member in a biased relationship such that the pulley member is substantially identically rotatable with rotation of the base plate in one direction in a non-actuated position until an impact load is encountered by the pulley member sufficient for the pulley member to biasedly rotate in the same direction less than the base plate in an actuated position to absorb the impact load. In the preferred embodiment, the biasing means comprises a plurality of springs with each spring connected to the base plate at one end of each spring and to the pulley member at an opposite end of each spring. The base plate preferably includes a plurality of arms extending therefrom and within an inner area defined by the pulley member. The springs are attached to the base plate by attachment to a portion of the arms extending therefrom.

It is therefore an object of the present invention to provide a novel impact pulley apparatus and method of using the same.

It is another object of the present invention to provide an impact pulley apparatus and method for attachment to a rotatable shaft of a motor associated with a high-speed media processing apparatus to absorb impact energy caused by media encountered during high-speed media processing.

It is a further object of the present invention to provide such an impact pulley apparatus which can be used with a step motor to inhibit and/or prevent the function of a rotatable shaft driven thereby from being compromised and to preserve the torque of the step motor when impact energy is encountered by the high-speed media processing apparatus.

It is still a further object of the present invention to provide an impact pulley apparatus and method for using the same wherein the impact pulley apparatus can be quickly and easily mounted to the rotatable shaft of a motor of a high-speed media processing apparatus and functions automatically to absorb impact energy encountered by the high-speed media processing apparatus.

Some of the objects of the invention having been stated, other objects will become evident as the description proceeds, when taken in connection with the accompanying drawings as best described hereinbelow.

BEST MODE FOR CARRYING OUT THE INVENTION

In accordance with the present invention, an impact pulley apparatus and method are provided for use with a high-speed media processing apparatus to absorb impact energy caused by the high-speed media processing apparatus encountering media to be conveyed. Referring to the figures of drawings, the impact pulley apparatus generally designated 10 comprises a base plate 20 for mounting on a rotatable shaft, such as rotatable shaft S of a high-speed media processing apparatus such that rotation of the shaft causes identical and simultaneous rotation of base plate 20. A pulley member 30 is operatively connected to base plate 20 by biasing means such that base plate 20 and pulley member 30 are in a biased relationship. While it is envisioned according to this invention that any suitable biasing means could be utilized, the biasing means preferably comprises a pair of extension springs 50A and 50B operatively connecting base plate 20 and pulley member 30 as described hereinbelow.

Figure 3:
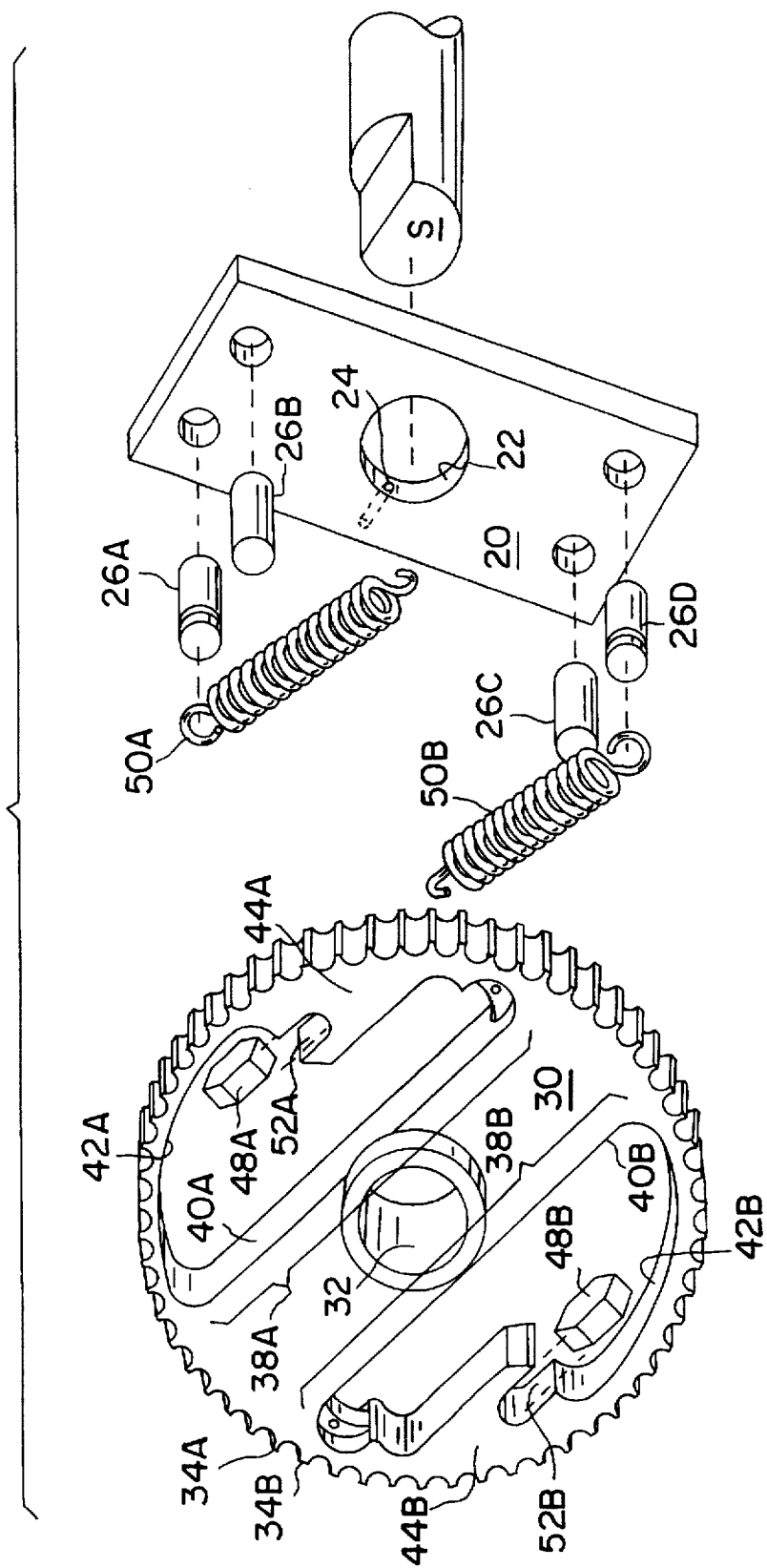
FIG. 3 of the drawings is an exploded view of the impact pulley apparatus of this invention.

The components of impact pulley apparatus 10 are perhaps best illustrated in the preferred embodiment in FIG. 3 of the drawings. Each of the individual components of impact apparatus 10 are preferably metal in construction, however, other suitable materials could be utilized for the individual components of impact pulley apparatus 10 as will be apparent to those of skill in the art of high-speed media processing. As shown, base plate 20 is rectangular in shape although it is envisioned that other suitable shapes could be utilized in accordance with this invention. Base plate 20 defines a central passage 22 therethrough for receiving a rotatable shaft of a motor associated with a high-speed media processing apparatus. Base plate 20 further comprises a side passage 24 extending in a substantially perpendicular manner with respect to central passage 22 and having opposing open ends on an outer surface of base plate 20 and an inner surface of central passage 22. Side passage 24 is adapted to receive a fastener of any conventional variety which can be used to secure a rotatable shaft within central passage 22.

A plurality of arms 26A, 26B, 26C and 26D extend from base plate 20 a distance sufficient to engage pulley member 30 as described hereinbelow. Arms 26A, 26B, 26C and 26D are each positioned proximate to a different corner of base plate 20, and it is contemplated according to this invention that arms 26A, 26B, 26C and 26D can be fixedly attached to base plate 20 or formed as an integral part thereof. As shown in the figures of drawings, arms 26A and 26D are diagonally opposing, and arms 26B and 26C are therefore diagonally opposing.

Pulley member 30 of impact pulley apparatus 10 is cylindrical in shape and defines a central passage 32 therethrough for receiving a portion of a rotatable motor shaft which has already passed through central passage 22 of base plate 20 when impact pulley apparatus 10 is in its assembled form wherein central passages 22 and 32 are coaxial. The outer circumferential wall of pulley member 30 is adapted for engaging a rotation mechanism, usually a belt, of a high-speed media processing apparatus in order to impart rotational force thereto. A plurality of teeth, such as teeth 34A and 34B are preferably defined on the outer circumferential wall of pulley member 30 for engaging the belt.

Pulley member 30 preferably comprises first inner area 38A and second inner area 38B which both can be open to the opposing sides of pulley member 30. First and second inner areas 38A and 38B are each adapted for receiving a pair of arms of base plate 20 such that the arms are moveable within the inner areas as further described hereinbelow. First and second inner areas 38A and 38B are defined by a plurality of walls within pulley member 30. The walls of each inner area preferably comprise at least one substantially straight wall proximate central passage 32 and a curved wall intersecting and extending from one end of the straight wall and terminating in a ledge which is spaced-apart from the straight wall. For example, first and second inner areas 38A and 38B are defined by straight walls 40A and 40B, respectively, and curved walls 42A and 42B, respectively, which terminate in ledges 44A and 44B, respectively. Ledges 44A and 44B can define slots 52A and 52B, respectively, therein for receiving removable dampers 48A and 48B, respectively, which preferably comprise urethane pads. Extension springs 50A and 50B operatively connect base plate 20 and pulley member 30, and each extension spring is positioned in either first inner area 38A or second inner area 38B when impact pulley apparatus 10 is in its assembled and operative form as each spring is connected at one end to an arm of base plate 20 and at an opposite end to corner 46A or 46B of first and second inner areas 38A or 38B, respectively. Each inner corner 46A and 46B of pulley member 30 is positioned within its corresponding inner area proximate an end of the straight wall opposite from the end intersecting the curved wall extending therefrom.

Figure 1:
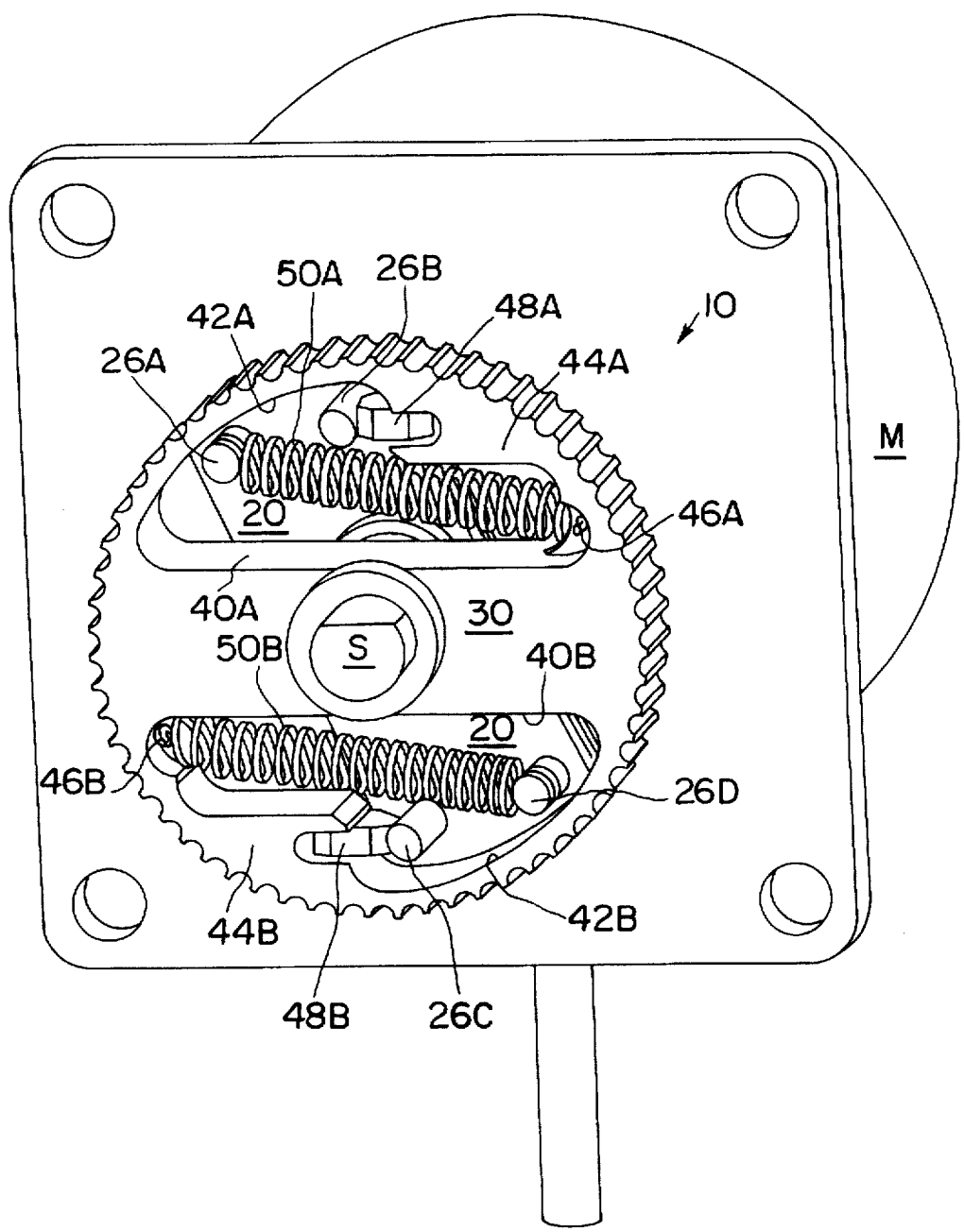
FIG. 1 of the drawings is a perspective side view of a preferred embodiment of the impact pulley apparatus of the present invention attached to a rotatable shaft wherein the impact pulley apparatus is in a non-actuated position.
Figure 2:
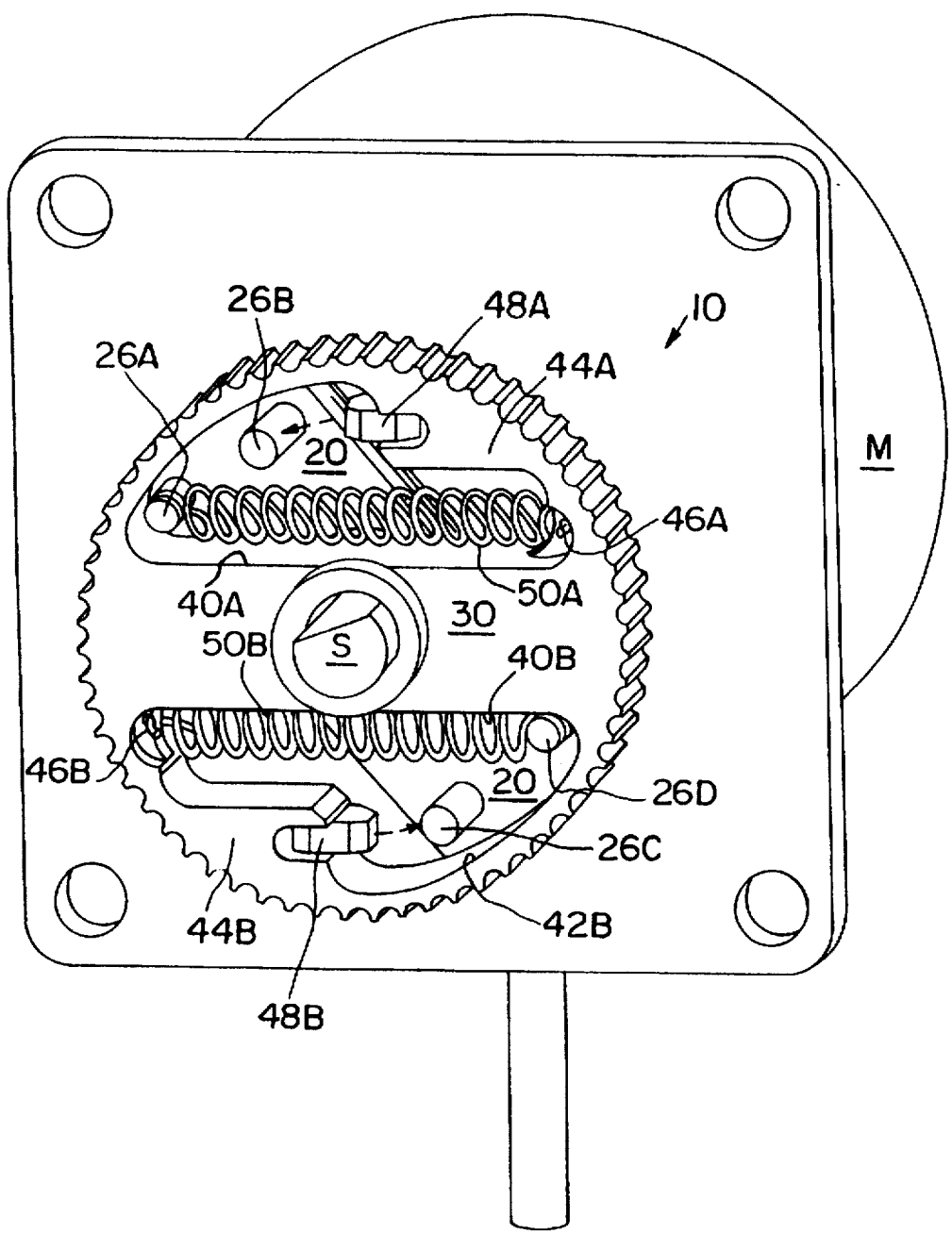
FIG. 2 of the drawings is a perspective view of the impact pulley apparatus of FIG. 1 in an actuated position.
Figure 4:
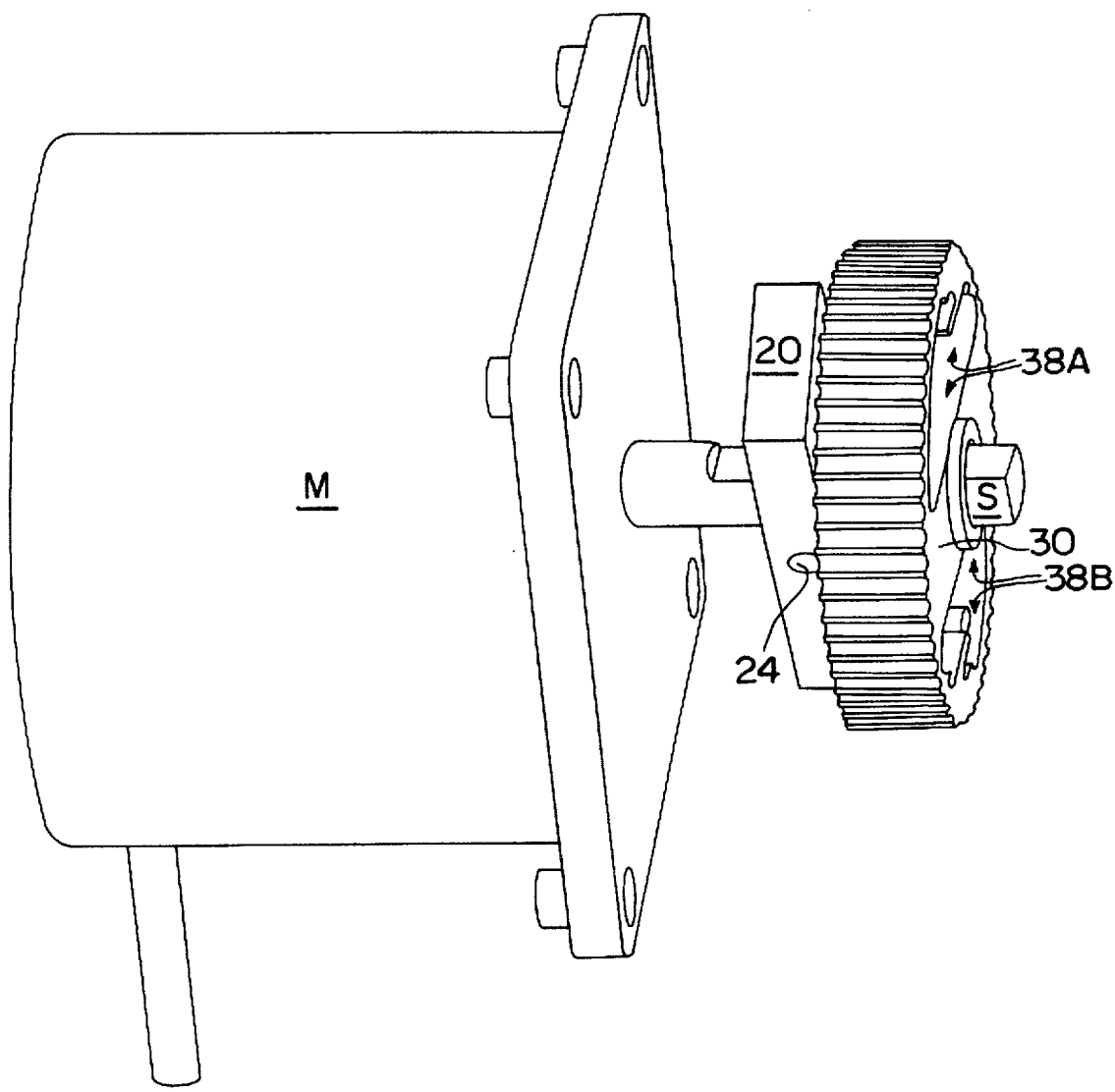
FIG. 4 of the drawings is another perspective view of the impact pulley apparatus shown in FIG. 1.

FIGS. 1, 2 and 4 of the drawings illustrate impact pulley apparatus 10 in its assembled form attached to rotatable shaft S of motor M used in a high-speed media processing apparatus. As will be apparent to those of skill in the art, motor M is preferably a step motor and allows precise control of rotatable shaft S and therefore impact pulley apparatus 10, although it is envisioned according to this invention that another suitable type of motor could be utilized.

As shown in FIGS. 1, 2 and 4, rotatable shaft S passes through central passages 22 and 32 of base plate 20 and pulley member 30, respectively, in the preferred embodiment. While rotatable shaft S is secured tightly within central passage 22 of base plate 20 so that rotation of rotatable shaft S causes identical rotation of base plate 20, rotatable shaft S is not tightly secured within central passage 32 of pulley member 30 as it is a primary feature of the present invention that pulley member 30 is directly rotatably driven only by base plate 20 to which it is biasedly connected. It will be appreciated in accordance with this invention that rotation of rotatable shaft S does not cause identical and simultaneous rotation of pulley member 30 by the mere passage of rotatable shaft S through central passage 32. Additionally, it is contemplated that rotatable shaft S can stop short of passing through central passage 32 of pulley member 30 and pass through central passage 32 of base plate 20 only. In such an embodiment, central passage 32 of pulley member 30 would not be necessary.

The biased operative connection of pulley member 30 and base plate 20 allow impact pulley apparatus 10 to be in a non-actuated position which is shown in FIG. 1 of the drawings and an actuated position, an example of which is shown in FIG. 2 of the drawings. For the actuated position to be attained, it will be appreciated that either pulley member 30 or base plate 20 could move by itself when the other is stationary or both could be moving simultaneously. Typically, however, base plate 20 will continue to be rotated in one direction and pulley member 30 will rotate in the same direction but less than base plate 20 while impact pulley apparatus 10 is in its actuated position.

In the non-actuated position shown in FIG. 1 of the drawings, arms 26A and 26B of base plate 20 extend within first inner area 38A, and arms 26C and 26D of base plate 20 extend within second inner area 38B. Arms 26A and are preferably positioned within first inner area 38A substantially between damper 48A and the intersection of straight wall 40A and curved wall 42A. Likewise, arms 26C and 26D are positioned within second inner area 38B substantially between damper 48B and the intersection of straight wall 40B and curved wall 42B. Spring 50A is positioned within first inner area 38A and extends connectedly between arm 26A and inner corner 46A. Likewise, spring 50B is positioned within second inner area 38B and extends connectedly between 26D and inner corner 46B of second inner area 38A. In this manner, arms 26A and 26B are biased toward damper 48A, and arm 26B actually engages damper 48A as it provides a stop therefore. Quite similarly, arms 26C and 26D are biased toward damper 48B, and arm 26C engages damper 48B as it provides a stop therefore. When rotatable shaft S and therefore base plate 20 are in a stationary position, it can therefore be readily understood that dampers 48A and 48B prevent rotation of pulley member 30 in a counter-clockwise direction while the structure of pulley member 30 and its operative connection to base plate 20 in a biased manner allows increasingly biased rotation of pulley member 30 in a clockwise direction until arms 26A and 26D become engaged with and against straight walls 40A and 40B, respectively, or the intersection of straight walls 40A and 40B with curved walls 42A and 42B, respectively.

Referring to FIG. 2 of the drawings, impact pulley apparatus 10 is illustrated in its actuated position. As shown, arms 26A and 26B have moved away from damper 48A. Likewise, arms 26C and 26D have moved away from damper 48B in second inner area 38B. Springs 50A and 50B continue to operatively connect pulley member 30 and base plate 20 in a biased manner, however, springs 50A and 50B are now in a further extended position because of the movement of arms 26A and 26D away from inner corners 46A and 46B, respectively. The actuated position of impact pulley apparatus 10 comprises a range of position of arms 26A–26D with a lowest actuated position being where arms 26B and 26C have barely moved away from dampers 48A and 48B, respectively, to a highest or most actuated position where arms 26A and 26D are engaged with and stopped from further rotation by straight walls 40A and 40B, respectively, as shown in FIG. 2. In this position, springs 50A and 50B cannot be extended any further, and therefore, impact pulley apparatus 10 is fully actuated.

In accordance herewith, impact pulley apparatus 10 includes biasing means which preferably comprises springs 50A and 50B and which operatively connect base plate 20 and pulley member 30 in a biased relationship such that pulley member 30 is identically rotatable with rotation of base plate 20 in one direction in a non-actuated position until an amount of impact energy or rotational resistance is encountered by pulley member 30 sufficient for pulley member 30 to biasedly rotate in the same direction less than base plate 20 in the actuated position. The biasing means preferably allows a maximum relative rotation of approximately thirty (30) degrees between pulley member 30 and base plate 20. The biasing means utilized can be selected to allow impact pulley apparatus 10 to become actuated only upon a predetermined amount of impact load or rotational resistance. For example, springs 50A and 50B are preferably preloaded in order to prevent impact pulley apparatus 10 from becoming actuated until an impact load of over eighty (80) percent of the rated torque of the motor associated therewith is encountered.

As discussed previously, it is common for high-speed media processing apparatuses to utilize a belt having one or more push members thereon for engaging and conveying media such as, for example, envelopes and envelope inserts such as folded sheets of paper. Impact pulley apparatus 10 of the present invention is adapted specifically for mounting on a rotatable shaft of a motor driving a belt or other rotation mechanism of a high-speed media processing apparatus to absorb a predetermined amount of an impact load or rotational resistance resulting from a push member of the belt encountering media to be conveyed. The ability of impact pulley apparatus 10 to absorb such an impact load is important in order to prevent the motor utilized to drive the belt from losing steps and thereby changing its rotary position.

Figure 5:
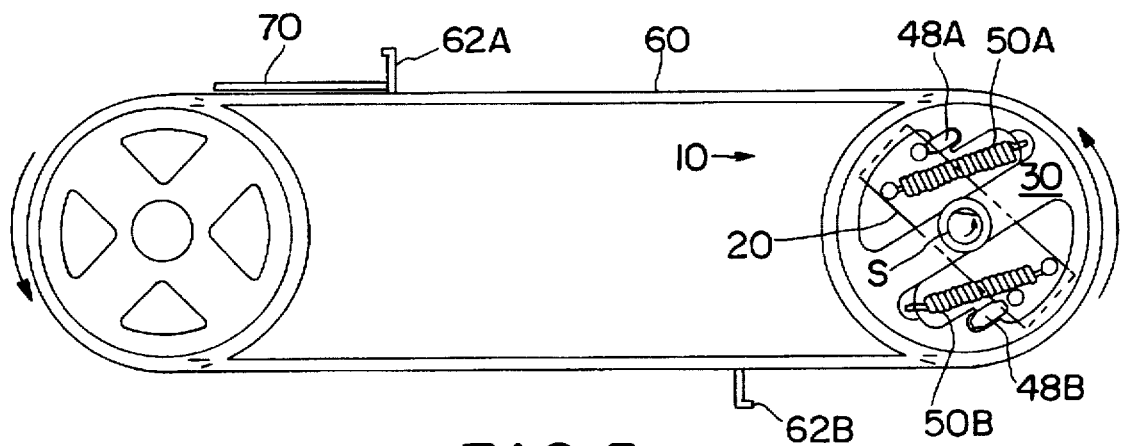
FIG. 5 of the drawings is a partial schematic illustration of the impact pulley apparatus of FIG. 1 in driven engagement with a belt of a high-speed media processing apparatus wherein the medium to be conveyed has yet to be engaged by a push member and the impact pulley apparatus is in its non-actuated position.

FIG. 5 of the drawings illustrates impact pulley apparatus 10 with pulley member 30 engaging a belt 60 such as in a high-speed media processing apparatus. Belt 60 has push members 62A and 62B thereon for engaging and forcibly conveying media to be conveyed such as medium 70 which, as discussed hereinabove, can be, for example, one or more envelopes or one or more envelope inserts such as folded sheets of paper. While it is envisioned that impact pulley apparatus 10 can be rotated in either a clockwise or counter-clockwise direction to likewise drive belt 60 and rotate push members 62A and 62B thereon, rotation of a belt of a high-speed media processing apparatus will sometimes only need to occur in one direction, such as, for example, the counter-clockwise direction indicated in FIGS. 5 and 6 in order to rotate belt 60 and push members 62A and 62B in the counter-clockwise direction to engage and forcibly convey medium 70.

Impact pulley apparatus 10 is shown in FIG. 5 in its non-actuated position as shown in FIG. 1 of the drawings. As can be seen, push member 62A is spaced-apart from medium 70 and is being advanced thereto in order to engage and forcibly convey medium 70. There is therefore no impact load on push members 62A or 62B or belt 60 to which they are attached.

Figure 6:
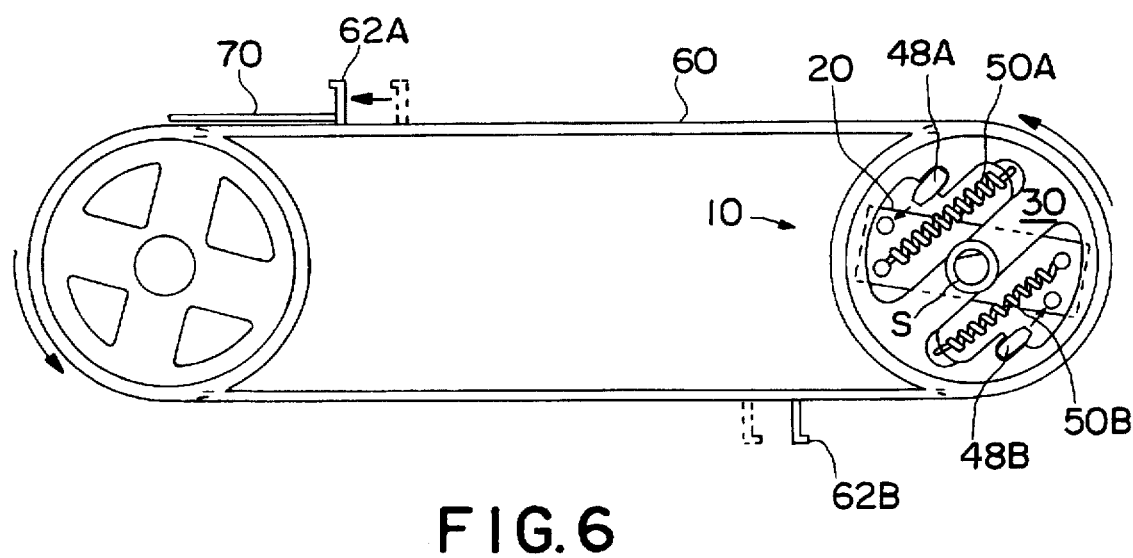
FIG. 6 of the drawings is a partial schematic illustration showing an advanced position of the high-speed media processing apparatus illustrated in FIG. 4 wherein the belt has been advanced by the impact pulley apparatus such that one of the push members has engaged the medium and the impact pulley apparatus is in an actuated position.

FIG. 6 of the drawings shows belt 60 in an advanced, rotated position wherein push member 62A of belt 60 has engaged medium 70 during rotation of belt 60 caused by pulley member 30 of impact pulley apparatus 10. The encounter and engagement of medium 70 by push member has caused some extent of impact load or rotational resistance to push member 62A and belt 60. This impact load is in turn imparted to pulley member 30 because of its engagement with belt 60 and would normally pass in turn to the rotatable shaft, such as rotatable shaft S, of the motor used to drive belt 60. Because of the advantageous features of the present invention as described hereinabove, impact pulley apparatus 10 reacts to the impact load by moving from its non-actuated position shown in FIG. 5 to an actuated position as shown in FIG. 6 in order to absorb some or all of the impact load caused by push member 62A encountering medium 70. Pulley member 30 is therefore in a position where it has rotated less than rotatable shaft S and base plate to absorb the impact load. The impact load is distributed over the time of relative rotation between pulley member 30 and rotatable shaft S which is the period of actuation of impact pulley apparatus 10. Springs 50A and 50B are preferably adapted such that the tension in springs and 50B will apply the full rated torque to the motor used to drive belt 60 just as pulley member 30 reaches its maximum relative rotation with respect to rotatable shaft S which is the highest or most actuated position of impact pulley apparatus The impact load caused by push member 62A encountering medium 70 will normally decrease soon after medium 70 is encountered, and as the impact load decreases, the biased operative connection of pulley member 30 to base plate 20 causes pulley member 30 to gradually be pulled back until impact pulley apparatus 10 is again in its non-actuated position. Dampers 48A and 48B of pulley member 30 act to decrease and/or prevent any spring return shock caused by arms 26 and 26C returning to their engaged position with dampers 48A and 48B in the non-actuated position of impact pulley apparatus 10. In accordance with this invention, it has been found that impact pulley apparatus 10 is capable of absorbing an impact load approximately 0.47 times the rated torque of a motor used to rotate impact pulley apparatus 10 in a high-speed media processing apparatus. It has also been found that impact pulley apparatus 10 is very effective for its intended purpose when pulley member 30 is used to drive a timing belt which in turn drives another rotation mechanism in a high-speed media processing apparatus to propel a stack of folded paper.

It is therefore seen that the present invention provides a novel impact pulley apparatus and method of using the same. It is also seen that the impact pulley apparatus of the present invention can be attached to a rotatable shaft of a motor associated with a high-speed media processing apparatus to absorb impact energy caused by media encountered by the high-speed media processing apparatus. It can also be appreciated that the present invention is particularly useful with a step motor of a high-speed media processing apparatus to inhibit and/or prevent the function of a rotatable shaft driven thereby from being compromised and to control and preserve the torque of the motor when impact energy is encountered by the high-speed media processing apparatus. Finally, it can further be appreciated that the impact pulley apparatus of the present invention can be quickly and easily mounted to the rotatable shaft of a motor of a high-speed media processing apparatus and can function automatically to absorb impact energy encountered thereby.

It will be understood that various details of the invention may be changed without departing from the scope of the invention. Furthermore, the foregoing description is for the purpose of illustration only, and not for the purpose of limitation, as the invention is defined by the following, appended claims.

What is claimed is:

1. An impact pulley apparatus for use with a high-speed media processing apparatus by driven attachment to a rotatable shaft of a motor associated therewith to absorb impact energy encountered by the high-speed media processing apparatus, said impact pulley apparatus comprising:

(a) a base plate for mounting on said rotatable shaft such that rotation of said shaft causes identical and simultaneous rotation of said base plate;

(b) a pulley member operatively connected to said base plate; and (c) biasing means operatively connecting said base plate and said pulley member in a biased relationship such that said pulley member is substantially identically rotatable with rotation of said base plate in one direction in a non-actuated position until an amount of impact energy is encountered by said pulley member sufficient for said pulley member to biasedly rotate in said direction less than said base plate in an actuated position to absorb the impact energy.

2. The impact pulley apparatus of claim 1 wherein said base plate includes a plurality of arms extending therefrom and within an inner area defined by said pulley member and wherein said biasing means attach to and extend between said pulley member and at least a portion of said arms.

3. The impact pulley apparatus of claim 2 wherein said pulley member defines a plurality of stops for engaging said arms to prevent said pulley member from rotating a predetermined extent less than said base plate.

4. The impact pulley apparatus of claim 3 wherein said predetermined extent is approximately thirty degrees (30°).

5. The impact pulley apparatus of claim 2 wherein said pulley member defines a plurality of inner ledges for biased engagement with another portion of said arms of said base plate in said non-actuated position.

6. The impact pulley apparatus of claim 5 wherein said inner ledges include urethane pads for engaging said arms.

7. The impact pulley apparatus of claim 1 wherein said biasing means allows said pulley member to move from said non-actuated position to said actuated position only upon exertion of a predetermined amount of impact resistance on said pulley member.

8. The impact pulley apparatus of claim 7 wherein said predetermined amount of impact resistance is over approximately eighty percent (80%) of a rated torque of a motor driving said rotatable shaft.

9. The impact pulley apparatus of claim 1 wherein said biasing means comprises a plurality of springs with each spring connected to said base plate at one end of each spring and to said pulley member at an opposite end of each spring.

10. The impact pulley apparatus of claim 9 wherein said biasing means comprises a pair of extension springs.

11. The impact pulley apparatus of claim 1 wherein said base plate and said pulley member both define an opening therethrough for receiving said shaft.

12. The impact pulley apparatus of claim 11 wherein said openings of said base plate and said pulley member are coaxial.

13. The impact pulley apparatus of claim 1 wherein said impact pulley apparatus is mounted to a rotatable shaft of a step motor.

14. An impact pulley apparatus for use with a high-speed media processing apparatus by driven attachment to a rotatable shaft of a motor associated therewith to absorb impact energy encountered by said rotatable shaft, said impact pulley apparatus comprising:

(a) a base plate having a plurality of arms extending therefrom and defining an opening therethrough for receiving said rotatable shaft;

(b) a pulley member defining an opening therethrough coaxial with said opening of said base plate for receiving said shaft, said pulley member defining open inner areas into which said arms of said base plate extend; and (c) biasing means operatively connecting said base plate and said pulley member in a biased relationship by attachment to said arms of said base plate and to an inner surface of said pulley member such that said pulley member is substantially identically rotatable with rotation of said base plate in one direction in a non-actuated position until an amount of impact energy is encountered by said pulley member sufficient for said pulley member to biasedly rotate in said direction less than said base plate in an actuated position to absorb the impact energy.

15. The impact pulley apparatus of claim 14 wherein said base plate includes at least a pair of diagonally opposed arms, said biasing means comprises at least two (2) springs, and each of said springs is attached at one end to said pulley member and at an opposite end to one of said pair of diagonally opposed arms.

16. The impact pulley apparatus of claim 15 wherein said base plate includes at least a first and second pair of diagonally opposed arms with said springs attached to said first pair of arms, said pulley member defines at least a pair of inner ledges on opposing inner surfaces of said pulley member, and each arm of said second pair of arms is biased against one of said inner ledges in said non-actuated position and each arm of said second pair of arms is separated from each inner ledge in said actuated position.

17. A method of absorbing impact energy encountered by a rotatable shaft of a high-speed media processing apparatus, said method comprising the steps of:

(a) providing an impact pulley apparatus for mounting on a rotatable shaft of a motor associated with a high-speed media processing apparatus, said impact pulley apparatus comprising:

(i) a base plate for mounting on said rotatable shaft such that rotation of said shaft causes identical and simultaneous rotation of said base plate;

(ii) a pulley member operatively associated with said base plate; and (iii) biasing means operatively connecting said base plate and said pulley member in a biased relationship such that said pulley member is substantially identically rotatable with rotation of said base plate in one direction in a non-actuated position until an amount of impact energy is encountered by said pulley member sufficient for said pulley member to biasedly rotate in said direction less than said base plate in an actuated position to absorb the impact energy;

(b) attaching said base plate to a rotatable shaft of a motor associated with a high-speed media processing apparatus such that rotation of said shaft causes identical and simultaneous rotation of said base plate; and (c) absorbing impact energy encountered by said pulley member by said pulley member rotating less than said base plate as said pulley member moves from said non-actuated position to said actuated position.

18. The method of claim 17 wherein the step of paragraph (c) occurs during rotation of said shaft and base plate.

19. The method of claim 17 wherein said pulley member returns to said non-actuated position after absorbing said impact energy.

* * * * *